United States Patent

Hager

[15] 3,680,710

[45] Aug. 1, 1972

[54] TIRE TRAY CONSTRUCTION

[72] Inventor: Clarence H. Hager, Rockford, Ill.

[73] Assignee: Modern Caster Co., Inc., Rockford, Ill.

[22] Filed: Dec. 21, 1970

[21] Appl. No.: 100,102

[52] U.S. Cl. ..................211/24, 108/2, 211/150, 220/73
[51] Int. Cl. ..............................A47f 5/00, A47f 7/04
[58] Field of Search..........211/24, 23, 169, 170, 168, 211/150, 99, 49, 126; 108/2, 7, 111, 59; 220/73

[56] References Cited

UNITED STATES PATENTS

| | | |
|---|---|---|
| 1,501,829 | 7/1924 | Wright..............................220/73 |
| 1,856,935 | 5/1932 | Turner......................211/150 X |
| 1,944,649 | 1/1934 | Smith........................211/150 X |
| 2,360,218 | 10/1944 | Gavin........................211/126 X |
| 2,563,212 | 8/1951 | Cole....................................108/2 |
| 2,716,495 | 8/1955 | Prevette et al............211/150 X |
| 2,858,028 | 10/1958 | Hunting et al. ................211/126 |

Primary Examiner—Ramon S. Britts
Attorney—McCanna, Morsbach, Pillote & Muir

[57] ABSTRACT

A mobile truck has a plurality of tire trays pivotally mounted thereon for movement between a generally horizontal position and a raised position. Each tray has a flared skirt at each side, a rolled edge at the rear to provide a hinge connection, and a formed flange member at the front. The flange member has a rolled edge at the bottom, and a diagonal bracket is shaped to engage the rolled edge.

7 Claims, 6 Drawing Figures

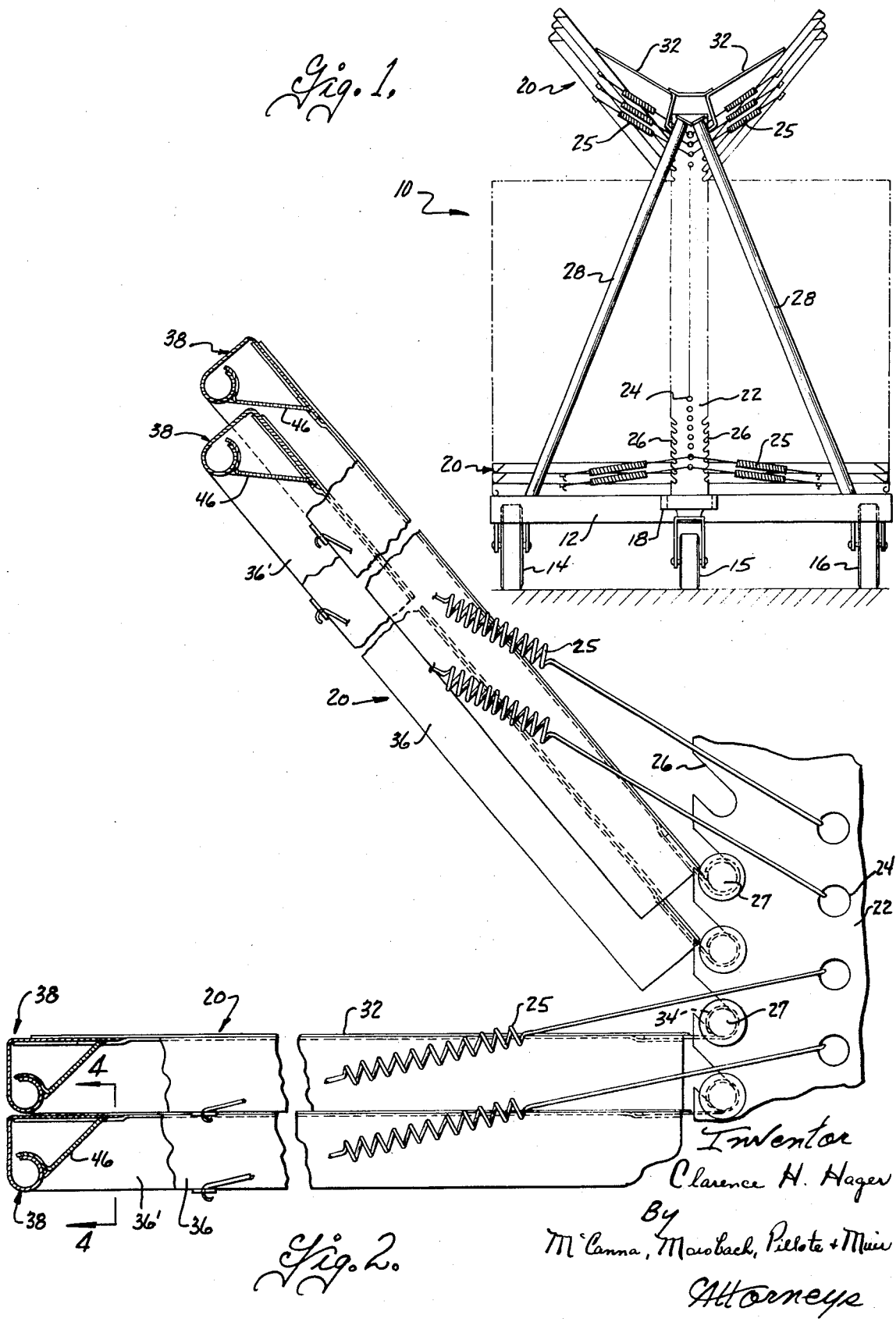

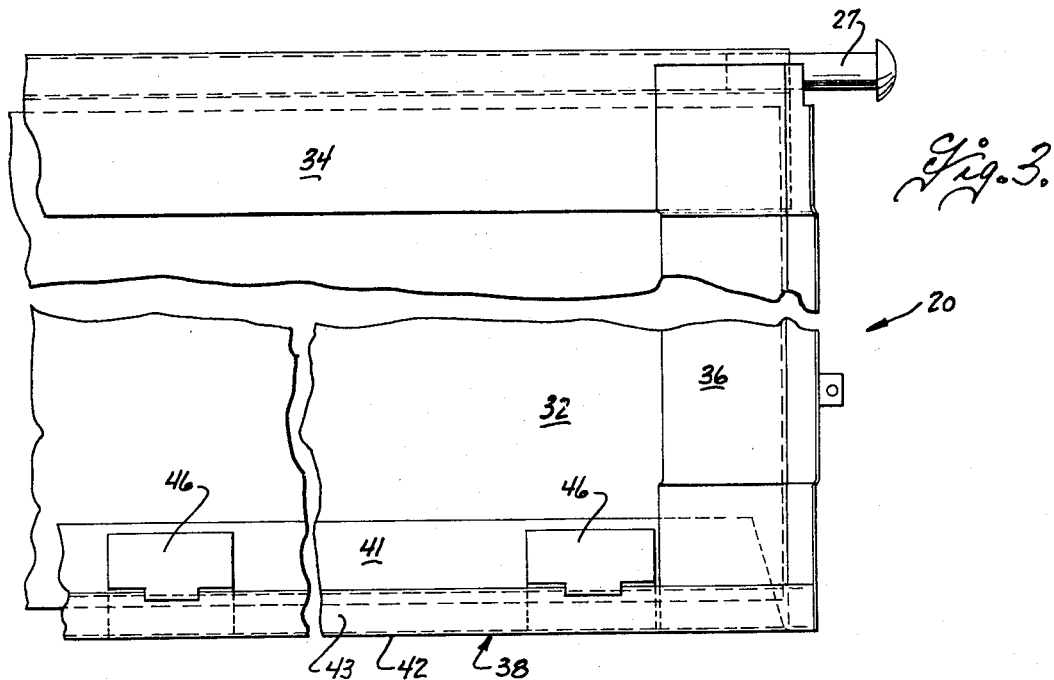
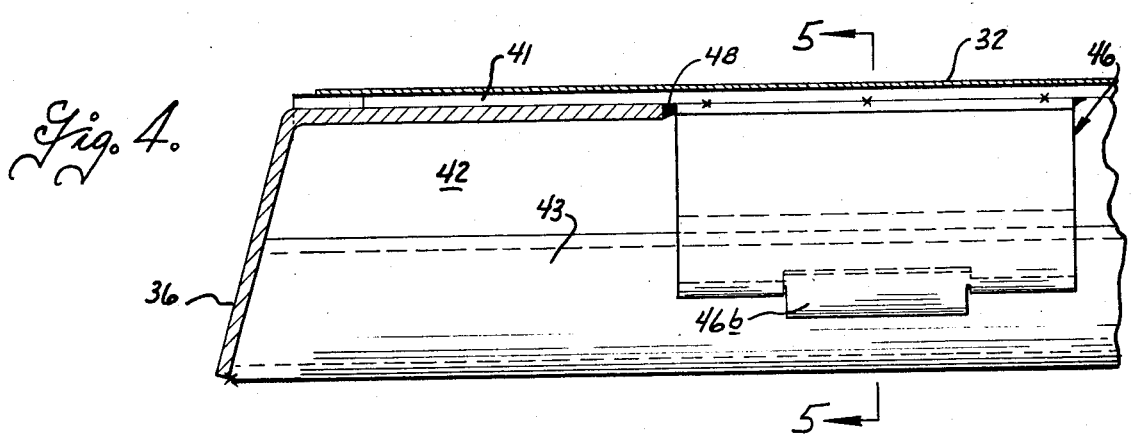
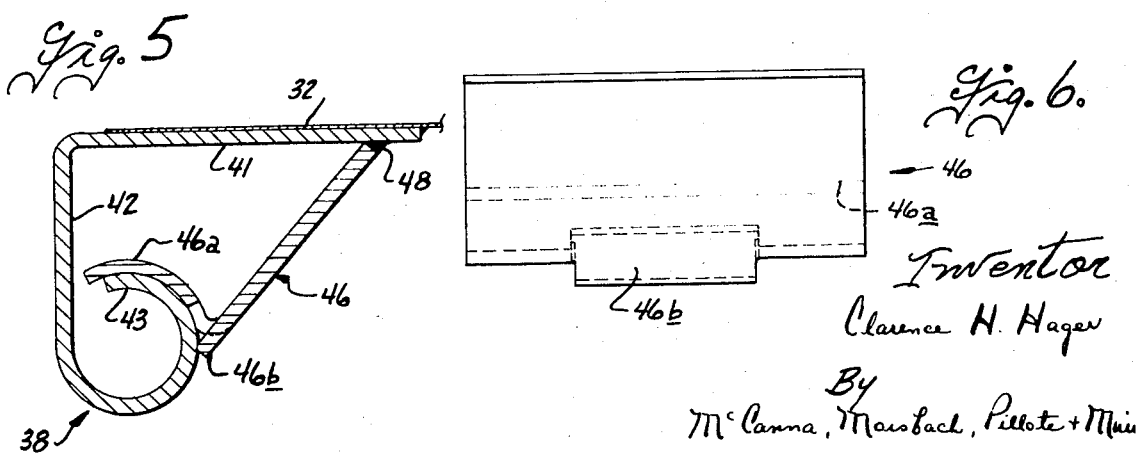

TIRE TRAY CONSTRUCTION

BACKGROUND:

The invention pertains generally to supports or racks and more particularly to a tire tray construction.

It is presently common in automobile tire plants to transport the tread-forming blanks on trays carried by a truck to the point where the treads are assembled on the tire carcass. The tire trays are hingedly mounted on a support structure carried by the truck for swinging movement between a horizontal position and a raised position. The tire treads are carried on the top of the trays and the trays have a depth sufficient to accommodate the tire tread on the subjacent tray. As the treads are removed, the trays are swung to the raised position to allow access to the tread on the subjacent tray.

SUMMARY

The present invention relates generally to an improved support structure and more particularly to a tire tray construction for use on a truck having a plurality of tire trays swingably supported thereon.

It is an object of the present invention to provide an improved tire tray construction for supporting tire treads.

Another object is to provide a tire tray construction having a formed flange member at the front with a rolled edge at the bottom for engaging the subjacent tray.

Still another object is to provide an apparatus in accordance with the foregoing object and having a diagonal bracket so formed that it need be only secured at one edge thereof.

Yet another object is to provide an apparatus in accordance with the foregoing and having a rolled edge at the rear of the tray to provide a hinge construction.

These, and other objects and advantages of the present invention, will become apparent as the same becomes better understood from the following detailed description when taken in conjunction with the accompanying drawings.

DRAWINGS

FIG. 1 is an elevational view of a hand truck utilizing the tire tray construction of the present invention and showing some of the trays in their lower position and some of the trays in their raised position;

FIG. 2 is a fragmentary elevational view of the embodiment in FIG. 1, on a much larger scale, and having portions broken away for a better illustration of the parts;

FIG. 3 is a fragmentary bottom view of a tire tray constructed in accordance with the present inventions:

FIG. 4 is a partial cross-sectional view taken generally along line 4—4 of FIG. 2 and on a still larger scale;

FIG. 5 is a sectional view taken generally along line 5—5 of FIG. 4; and

FIG. 6 is a rear elevational view of the diagonal bracket.

DESCRIPTION

Reference is now made more particularly to the drawings wherein similar reference characters indicate the same parts throughout the several views.

A mobile truck 10 which incorporates the present invention is shown in FIG. 1. The truck includes a bed 12 supported by a plurality of wheels 14-16, at least one of which may be a caster-type wheel such as wheel 15. A hitch 18 is conveniently provided at the front and rear sides of the bed. A plurality of trays, generally designated 20, are hingedly mounted on an upright support 22. The support has a plurality of centrally located openings 24 for holding one end of springs 25, and a plurality of slots 26 at the lateral edges thereof to receive hinge pins 27 (See FIG. 2). The support 22 may be braced in any convenient manner as, for example, members 28. The identical support structure is found at both the front and rear of the bed. These structures are spaced to accommodate the tire trays 20 therebetween. As can be seen in FIG. 1, the tire trays 20 are movable between a lower position and a raised position and are held at the raised position by the springs 25. A stop 32 is provided for engaging the uppermost tire tray 20 in the raised position. The structure thus far described is conventional and additional description is deemed unnecessary.

The tire tray 20 includes a top wall 32 having a smooth upper surface for receiving the tire tread thereon and supported by a generally rectangular frame. The frame includes a rear member 34, side members 36, 36', and a formed flange member 38 at the front. The rear frame member 34 is formed with a rolled edge to receive the hinge pin 27 for supporting the tire tray for the swinging movement. The side members 36, 36' are in the form of angle irons, the internal angle of which is greater than 90° and preferably about 105° (See FIG. 4) to allow the trays to nest in the raised position as best shown in FIG. 2.

The flange member 38 is best shown in FIG. 5 and includes an upper member 41 and a depending front member 42 having a rearwardly rolled edge 43. Brace and guide members 46, conveniently three in number, are provided at spaced points across the length of the flange member 38. The brace and guide members 46 extend upwardly and inwardly from the rolled edge 43. The brace and guide members are formed with an arcuate portion 46a that extends part way around the rolled edge, and a tongue 46b that is struck from the arcuate portion and extends generally tangential to the rolled edge 43. The upper edge of the brace members are secured, as by a weld 48, to the underside of the top member 41.

The rolled edge 43 has been provided at the front of the tire tray to minimize possible injury to the workman when removing the tire tread from the tray 20, as may occur if his hand strikes the lower edge of a superposed raised tray. In addition, the rolled edge cooperates with the brace member 46 to aid in guiding the trays back to a horizontal position when the nested raised trays are subsequently pulled downwardly as is usually done prior to re-transporting the truck. As best seen in FIG. 2, the inclined brackets 46 engage the front edge of the subjacent tray and serve as a ramp to guide the same downwardly when the top tray is forced toward the lower position. Thus it can be seen that the bracket 46 reinforces the flange member 38 but, because of its peculiar shape, may be secured only at the top edge to perform this function. This is an obvious advantage in assembly of the tire trays 20. Additionally, the bracket 46 serves the function of a guide when the trays are simultaneously moved from their raised, nested position to the lower position.

The embodiments of the invention in which an exclusive property or privilege is claimed are defined as follows:

1. A tire tray for use on a truck for transporting tire treads and having a plurality of tire trays swingably mounted on a support for movement between a lower, generally horizontal position and a raised position, the tire tray comprising: a top wall having a smooth upper surface for receiving the tire tread thereon; a depending and outwardly flaring skirt portion at each lateral side edge of the top wall to reinforce the same; means at the rear edge of the top wall for providing a hinge connection to the support; a formed flange member at the front edge of the top wall to support the top wall and provide a leg for engaging the subjacent tire tray in the lower position; the formed flange member having an upper member underlying the top wall and attached thereto, and a depending front member having a rearwardly rolled edge at its lower end to present a smooth surface for engaging the subjacent tire tray; and a diagonal bracket having a body portion extending between the rolled edge and the underside of the tire tray, and the bracket also having a lower arcuate portion shaped complementary to and engaging the rolled edge whereby the bracket is supported thereon without the necessity of additional fastening means between the bracket and rolled edge.

2. A tire tray as set forth in claim 1 wherein the means for providing a hinge connection to the support comprises a rear member extending along substantially the entire rear edge of the top wall and having a front portion secured to top wall and a rear portion with a rolled edge, and a hinge pin at least partially surrounded by the rolled edge of the rear member and mounted on the support.

3. A tire tray as set forth in claim 1 wherein the rolled edge of the formed flange member has an arcuate outer surface; and wherein the lower portion of the bracket is laterally offset from the body portion and has an arcuate surface complementary to the outer surface of the formed flange member and contiguous thereto.

4. A tire tray as set forth in claim 3 wherein the body portion of the bracket is generally tangential to the arcuate surface of the rolled edge of the flange member.

5. A tire tray for use on a truck for transporting tire treads and having a plurality of tire trays swingably mounted thereon, the tire tray comprising: a top wall having an upper surface for supporting the tire tread thereon; means at the rear edge of the top wall for providing a hinge connection to the truck; a formed flange member at the front edge of the top wall to rigidify the same and provide a leg for engaging the subjacent tire tray; the formed flange member having an upper member underlying the front edge of the top wall and secured thereto, and a depending front member at about a right angle to the upper member and having a rearwardly rolled edge at its lower end; a bracket having a body portion generally tangential to the rolled edge and extending therefrom to the upper member; the bracket also having an arcuate portion offset upwardly from the body and shaped complementary to the rolled edge of the flange member thereby supporting the bracket thereon; and means securing the upper end of the body portion of the bracket to the upper member of the flange member; whereby said last-mentioned means and the arcuate portion hold the bracket in position.

6. The combination of claim 5 wherein the bracket also has a tongue struck from the arcuate portion and forming the lower end of the body portion.

7. The combination of claim 6 wherein the body portion and tongue are collinear, and the tongue is struck from a central area of the arcuate portion.

* * * * *